Feb. 27, 1923.

F. SALA

HORSESHOE

Filed July 2, 1921

1,447,153

Frank Sala
INVENTOR

BY Victor J. Evans
ATTORNEY

Patented Feb. 27, 1923.

1,447,153

UNITED STATES PATENT OFFICE.

FRANK SALA, OF CHICAGO, ILLINOIS.

HORSESHOE.

Application filed July 2, 1921. Serial No. 482,187.

*To all whom it may concern:*

Be it known that I, FRANK SALA, a citizen of the United States, residing at Chicago, in the county of Cook and State of Illinois, have invented new and useful Improvements in Horseshoes, of which the following is a specification.

This invention relates to horseshoes and an object of the invention is to provide a horseshoe designed to prevent slipping of a horse shod with the improved shoes, when traveling over icy, snowy or slick surfaces.

More specifically the invention comprehends the provision of a horseshoe which has a plurality of substantially V-shaped bars or calks attached to its under surface and the apices of which calks are positioned in alinement substantially equidistant of the side edges of the horseshoe presenting sharp angles forwardly for biting into the surface over which the horse is traveling and being particularly useful in assisting the horse in holding back when going down an incline.

Figure 1:
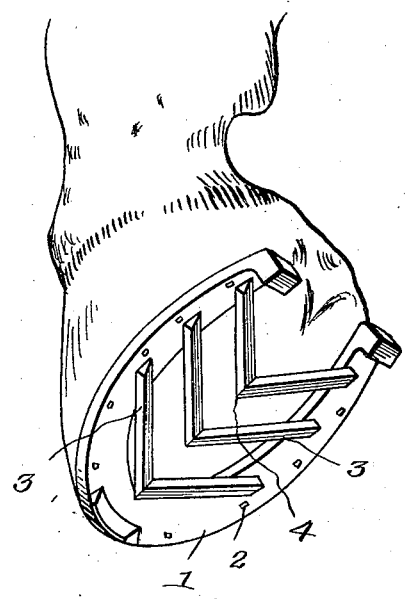
Figure 2:
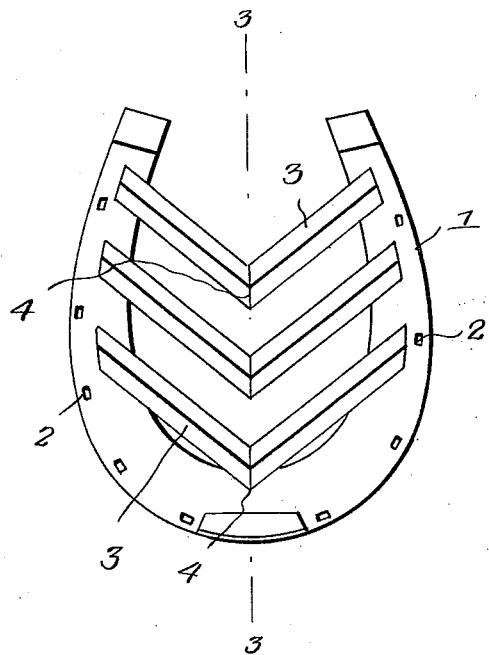
Figure 3:
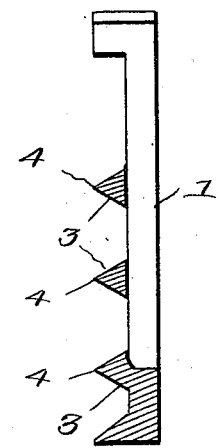

Other objects of the invention will appear in the following detailed description and in the accompanying drawing wherein:

Fig. 1 is a perspective view of the improved horseshoe showing it applied to a horse's hoof, Fig. 2 is a top plan of the improved horseshoe, and Fig. 3 is a section on the line 3—3 of Fig. 2.

Referring more particularly to the drawing the improved horseshoe structure includes the usual type of horseshoe 1 shaped to fit a horse's hoof and provided with a plurality of spaced nail-receiving openings 2. The under surface of the shoe 1 has a plurality of calks or bars 3 attached thereto in any suitable manner preferably by welding and each of the calk structures 3 is triangular-shaped in cross-section and substantially V-shaped in plan having its apex 4 positioned forwardly on the shoe and at substantially the transverse center of the shoe thereby presenting relatively sharp points at the central portion of the shoe 1 which will assist the horse in holding back or prevent it from slipping when going down an incline. By positioning the substantially V-shaped calks crosswise of the shoe with their apices forwardly they will prevent slipping of the horse when traveling over a smooth or icy surface owing to the fact that they are arranged so that the weight and motion of the horse will cooperate therewith and the substantially V-shape of the calks or grippers will tend to pack snow or ice back of the horse's foot giving it a direct abutment and materially assisting its travel.

While in the drawing only three of the calks or grippers are shown, it is to be understood that any number of them may be provided as required by the size of the shoe, without departing from the spirit of this invention.

It is of course, to be understood that the invention may be constructed in various other manners and the parts associated in different relations, and therefore, I do not desire to be limited in any manner except as set forth in the claims hereunto appended.

Having thus described my invention what I claim is:

1. An anti-slipping horseshoe structure comprising a horseshoe, and a plurality of substantially V-shaped calks having their ends secured to the side portions of the horseshoe and their apices alining substantially equidistant of the side edges of the shoe.

2. An anti-slipping horseshoe structure comprising a horseshoe, and a plurality of substantially V-shaped calks having their ends secured to the side portions of the horseshoe and their apices alining substantially equidistant of the side edges of the shoe, the apices of said substantially V-shaped calks extending forwardly towards the forward edge of the shoe.

3. An anti-slipping horseshoe structure comprising a horseshoe, and a plurality of substantially V-shaped calks having their ends secured to the side portions of the horseshoe and their apices alining substantially equidistant of the side edges of the shoe, said calks being substantially triangular shaped in cross-section.

4. A horseshoe structure comprising a shoe and a plurality of calks each V shape in plan and triangularly shaped in cross section and having their ends secured to the shoe with the apex portions in alinement and centrally located with relation to the shoe, certain edges of the calks extending parallel to each other and to the bottom of the shoe.

5. A non-skid device for draft animals, comprising a supporting frame, and a series of flat substantially V-shaped surface-engaging members transversely mounted thereon from side to side of the horseshoe intermediate the forward and rear ends thereof.

6. A non-skid device for draft animals, comprising a supporting frame simulating in appearance the ordinary U-shaped horseshoe, and a series of V-shaped members mounted on the bottom of said shoe in uniform relation, the apex of each of said members pointing to the toe of said shoe.

In testimony whereof I affix my signature.

FRANK SALA.